(12) United States Patent
Sato (10) Patent No.: US 8,218,302 B2
(45) Date of Patent: Jul. 10, 2012

(54) DISPLAY UNIT, INFORMATION APPARATUS WITH DISPLAY UNIT, AND METHOD OF ASSEMBLING DISPLAY UNIT

(75) Inventor: Jun Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 1094 days.

(21) Appl. No.: 11/269,818

(22) Filed: Nov. 9, 2005

(65) Prior Publication Data

US 2006/0243638 A1 Nov. 2, 2006

(30) Foreign Application Priority Data

Apr. 21, 2005 (JP) .................. 2005-123225

(51) Int. Cl.
- G06F 1/16 (2006.01)
- G06F 3/038 (2006.01)
- H05K 5/00 (2006.01)
- H05K 7/00 (2006.01)
- G09G 5/00 (2006.01)

(52) U.S. Cl. .................. 361/679.21; 349/60; 312/223.2; 345/204

(58) Field of Classification Search .................. 345/905, 345/204; 361/681, 683–684, 379.3, 679.21; 312/223.2–223.3; 349/60
See application file for complete search history.

(56) References Cited

U.S. PATENT DOCUMENTS

| | | | | |
|---|---|---|---|---|
| 4,766,426 A * | 8/1988 | Hatada et al. | ................. | 345/206 |
| 5,882,220 A * | 3/1999 | Horii et al. | .................... | 439/297 |
| 6,494,429 B2 * | 12/2002 | Tajima | ......................... | 248/473 |
| 6,883,694 B2 * | 4/2005 | Abelow | ........................ | 224/666 |
| 7,120,010 B2 * | 10/2006 | Tajima | ..................... | 361/679.21 |
| 7,121,010 B2 * | 10/2006 | Marshall et al. | ................ | 33/286 |
| 2002/0080297 A1 * | 6/2002 | Sung | ............................... | 349/58 |
| 2002/0154474 A1 * | 10/2002 | Merz et al. | .................... | 361/683 |

FOREIGN PATENT DOCUMENTS

JP 2001-175608 6/2001

* cited by examiner

*Primary Examiner* — Amr Awad
*Assistant Examiner* — Michael Pervan
(74) *Attorney, Agent, or Firm* — Wenderoth, Lind & Ponack, L.L.P.

(57) ABSTRACT

A display unit has a display device; a first case with an opening, covering the front surface of the display device; and a second case covering the back surface of the display device. The first case has a frame part enclosing the opening, and a side wall extending from the frame part toward the second case over the entire circumference of the frame part. The display device is placed on the frame part so as to be enclosed by the side wall. At least two support rods are fixed to the side wall and press the display device. The number of parts, man-hours, and weight of the unit can be reduced.

22 Claims, 6 Drawing Sheets

DISPLAY UNIT, INFORMATION APPARATUS WITH DISPLAY UNIT, AND METHOD OF ASSEMBLING DISPLAY UNIT

TECHNICAL FIELD

The present invention relates to a display unit of an information apparatus, especially to a packaging structure of the display unit.

BACKGROUND OF THE INVENTION

In recent years, a wide variety of information apparatuses have been provided that are equipped with display units, such as a notebook-size personal computer ("notebook computer" hereinafter) and a personal digital assistant. Such an apparatus has a display device with a large display area as compared to the dimensions of its packaging, thus requiring a large opening of the front surface of the packaging. Accordingly, the part on which the display device is mounted has insufficient mechanical strength, causing the entire packaging to twist.

A description is made of a method of mounting a display device for this conventional type of apparatus, taking as an example a personal digital assistant as disclosed in Japanese Patent Unexamined Publication No. 2001-175608. More specifically, the conventional personal digital assistant, with its touch panel and liquid crystal display overlapping each other, has a square U-shaped gasket fitted over the ends of their peripheries. The digital assistant further has a metal frame fixed so as to be pressed against the case to support the gasket.

A personal digital assistant with such a conventional makeup causes a problem with increasing the number of parts and the man-hours required for mounting.

In addition, thin-walled packaging has overall reduced mechanical strength and tends to be twisted, and thus it is difficult to reduce the weight of the packaging.

SUMMARY OF THE INVENTION

A display unit according to the present invention has a display device, a first case having an opening, covering the front surface of the display device, and a second case covering the back surface of the display device. The first case has a frame part enclosing the opening, and a side wall orthogonally extending from the frame part toward the second case over the entire circumference of the frame part. The display device is placed on the frame part in a state enclosed by the side wall. At least two support rods are fixed to the side wall and press the display device.

Meanwhile, a method of assembling a display unit according to the present invention involves fixing support rods to the side wall while the support rods are pressed toward the display device.

The present invention provides a display unit that requires a small number of parts and a small number of man-hours to assemble owing to its simple makeup, that has reduced weight owing to its thin packaging material, and that is resistant to torsion owing to its reinforced packaging strength utilizing the rigidity of the retained display device. Additional objects and advantages of the present invention will be apparent from the following detailed description of the embodiment, which is best understood with reference to the accompanying drawings.

DETAILED DESCRIPTION

The present invention relates to a display unit that utilizes the rigidity of the display device to improve the mechanical strength of the packaging, and that allows for reduction of the weight of the entire apparatus owing to a reduced number of parts and simple makeup.

Hereinafter, a description is made of a display unit of an information apparatus according to an embodiment of the present invention, using FIGS. 1 through 10C.

Figure 9:
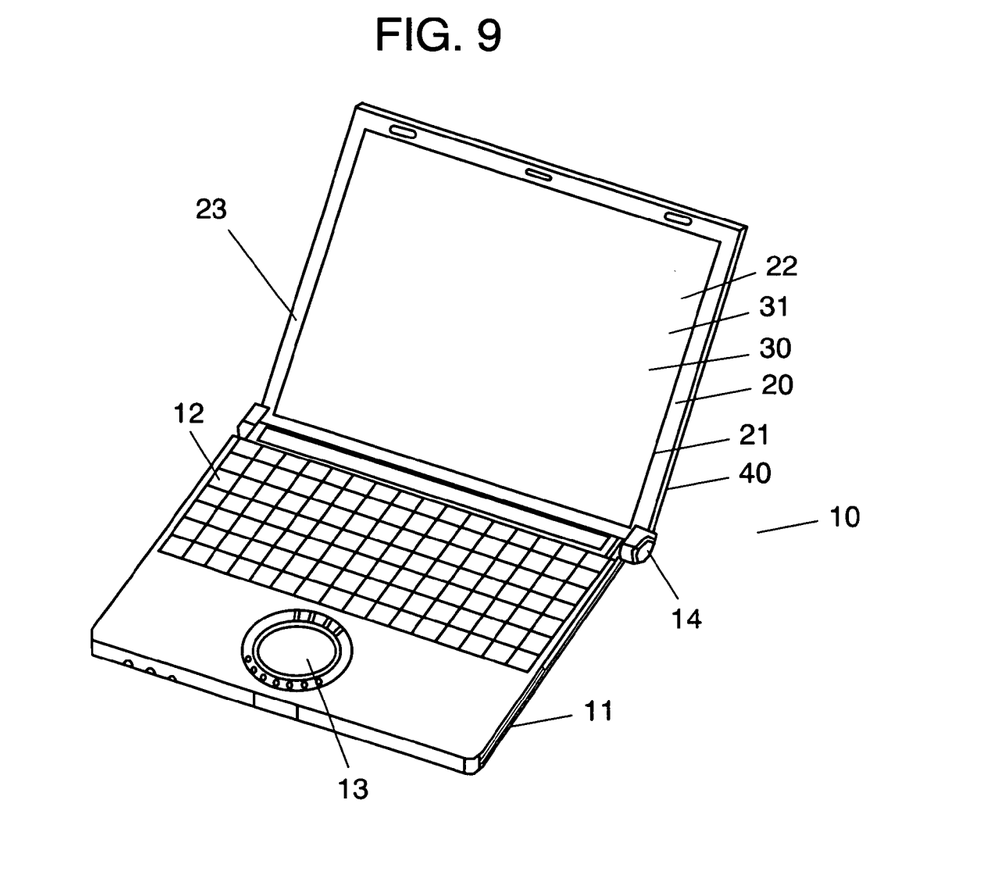
FIG. 9 is an external perspective view of a notebook-size personal computer according to an embodiment of the present invention.

FIG. 9 illustrates a makeup of notebook computer 10 equipped with a display unit according to the embodiment. Main body 11 of notebook computer 10 is loaded with keyboard 12, track pad 13, and other elements. Further, display unit 20 is attached to main body 11 in a swingable manner such that the display unit 20 can be held at an arbitrary position halfway through the swing by means of hinge 14. Display unit 20 can be swung to be lifted from main body 10 so that the operator can adjust it to obtain a suitable viewing angle.

The embodiment is characterized by this makeup of display unit 20. Hereinafter, a description is made using FIGS. 1 through 10. Here, the same elements are given the same reference characters in FIGS. 1 through 10.

As shown in FIGS. 1 through 10, display unit 20 is a unit in which display device 30 is held between front cabinet 21 and rear cabinet 40. Here, in this embodiment, a description is made using front cabinet 21 and rear cabinet 40 as examples of a first case and a second case, respectively. Display device 30 may include a liquid crystal display device, for example. The display device preferably uses a member with high rigidity such as a glass substrate because the rigidity of the display device largely influences that of the display unit of the present invention.

Figure 8:
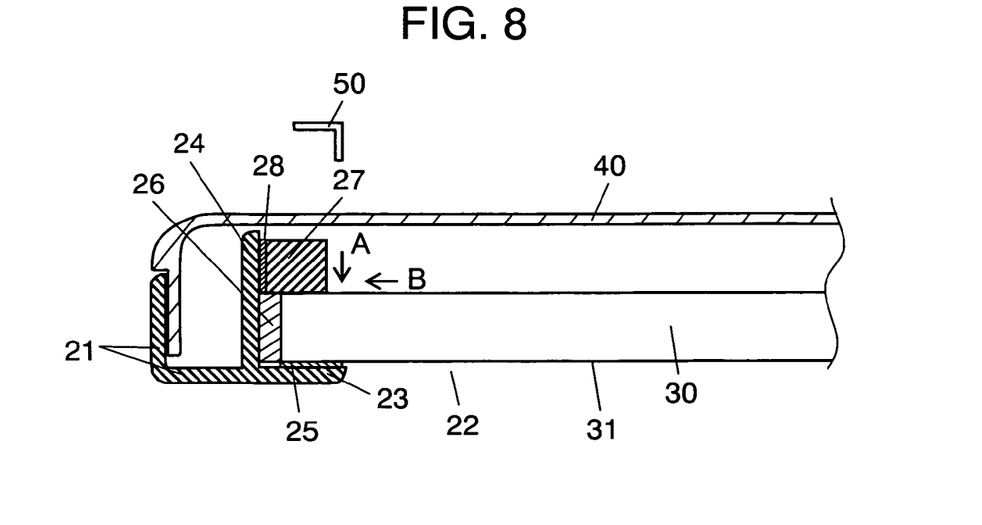
FIG. 8 is a partially sectional view of a state of the display unit with the display device attached.

As shown in FIG. 9, front cabinet 21 has large opening 22 at the front surface thereof (at the operator side) so that display surface 31 of display device 30 is visible. Frame part 23 around opening 22 is arranged so as to support only the periphery of display surface 31 of display device 30. As shown in FIG. 8, side wall 24, extending from frame part 23, rises roughly vertically (perpendicular to frame part 23) toward rear cabinet 40. Display device 30 is contained within the quadrate framework formed by side wall 24 and placed on frame part 23.

Figure 1:
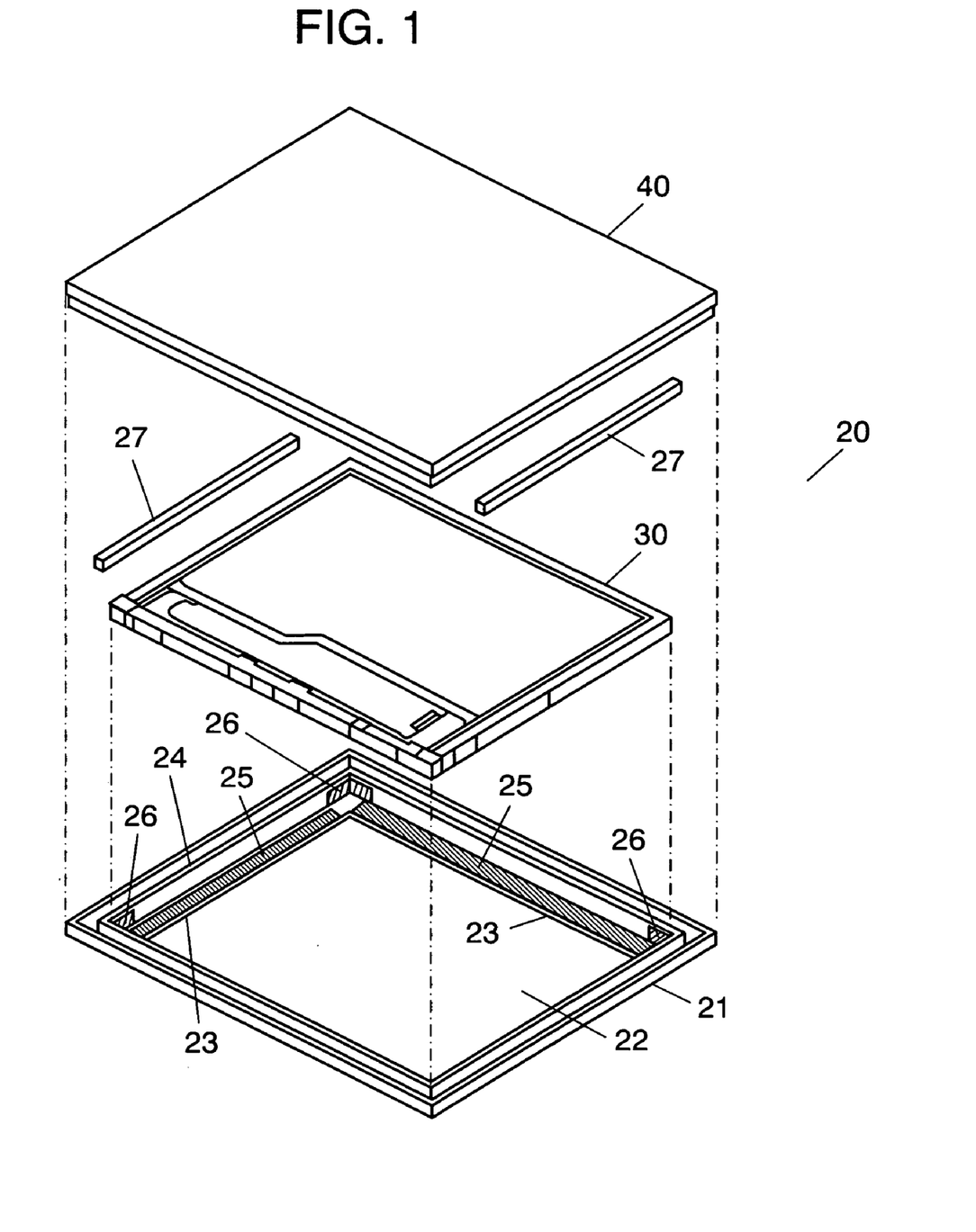
FIG. 1 is an exploded perspective view illustrating a display unit of an information apparatus according to an embodiment of the present invention.
Figure 2:
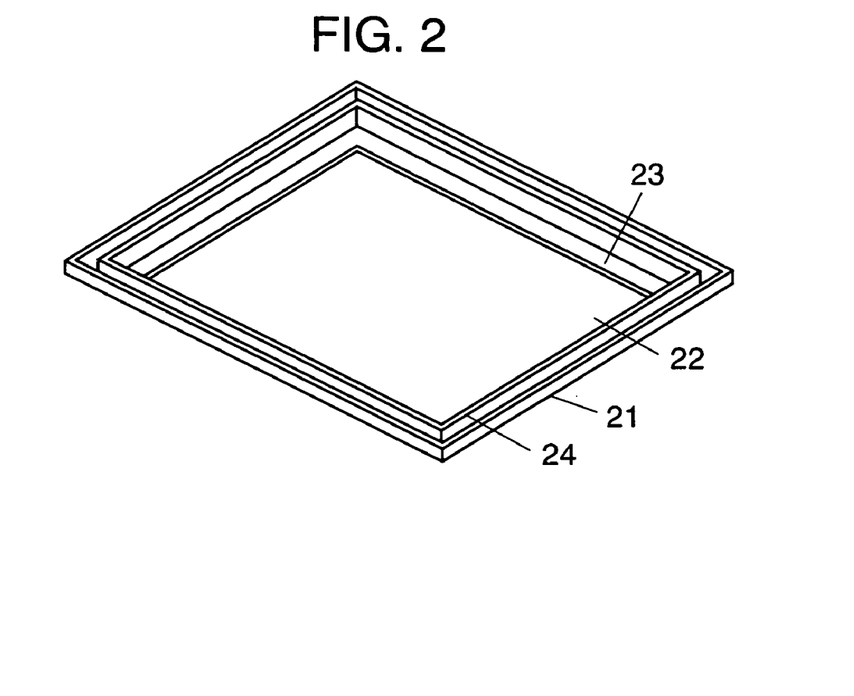
FIG. 2 is a perspective view illustrating the structure of a front cabinet of the display unit of the information apparatus according to the embodiment of the present invention.
Figure 3:
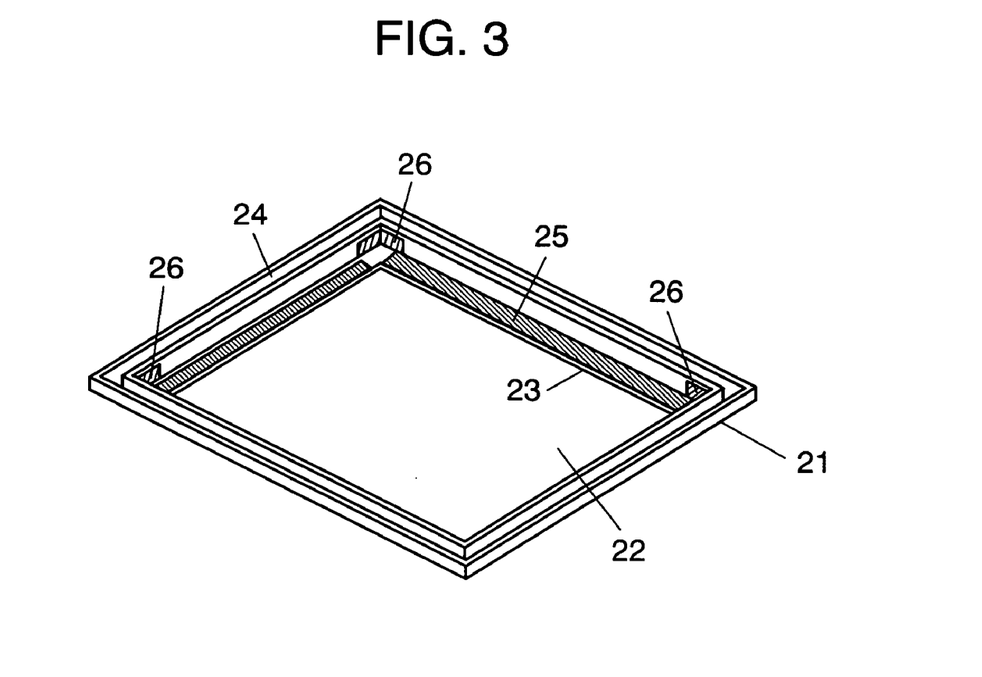
FIG. 3 is a perspective view illustrating the structure of the front cabinet of the display unit according to the embodiment of the present invention, with cushions and corner dampers at four corners.
Figure 4:
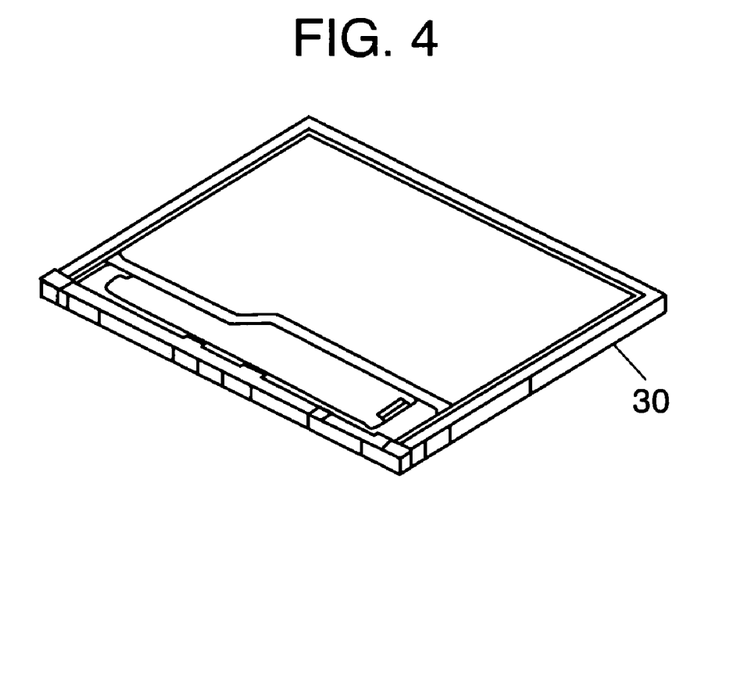
FIG. 4 is a perspective view illustrating a display device according to the embodiment of the present invention.
Figure 5:
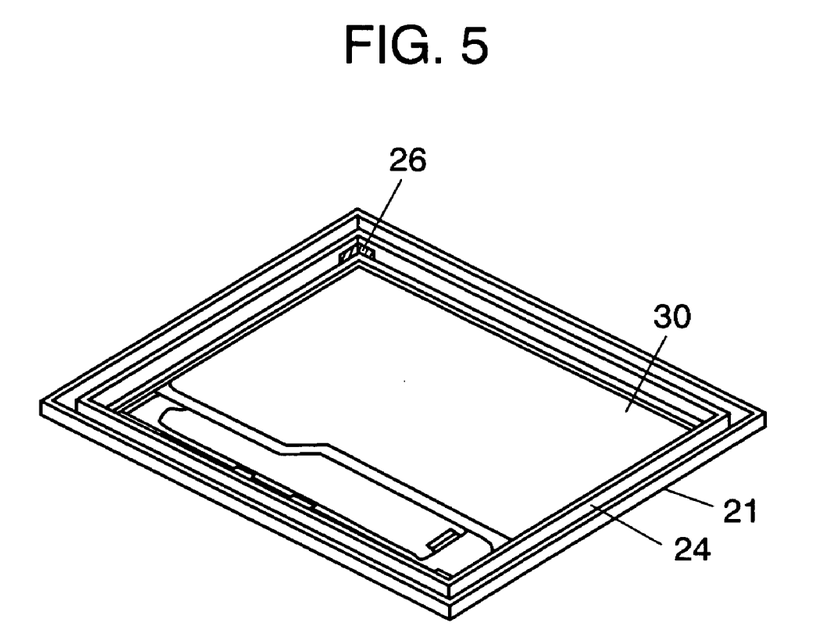
FIG. 5 is a perspective view illustrating a state of the front cabinet of the display unit according to the embodiment of the present invention, with a display device placed.
Figure 6:
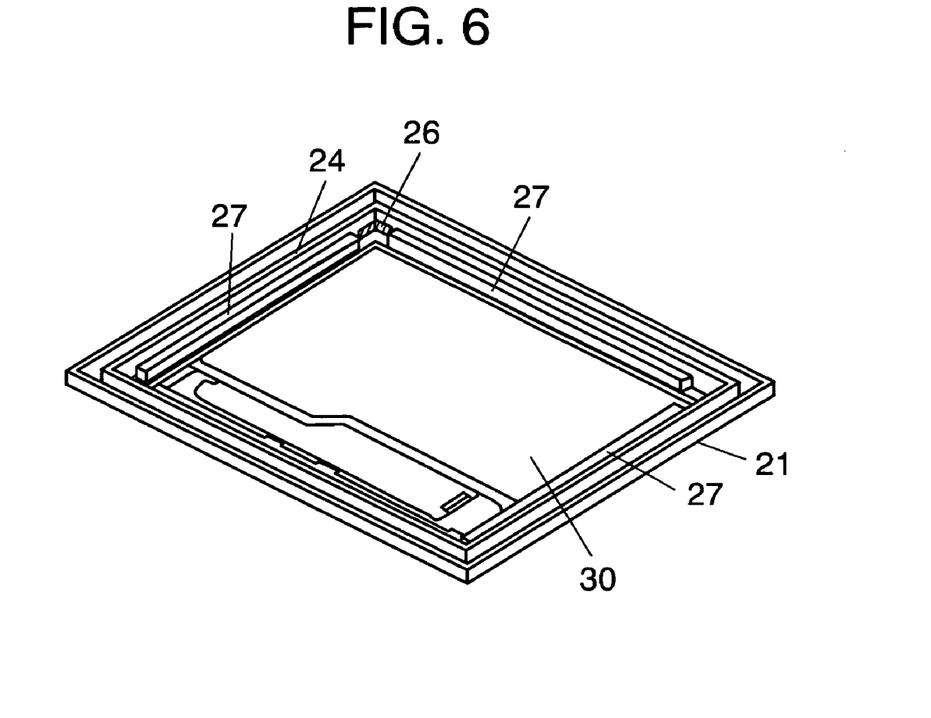
FIG. 6 is a perspective view illustrating a state of the front cabinet of the display unit according to the embodiment of the present invention, with dampers.
Figure 7:
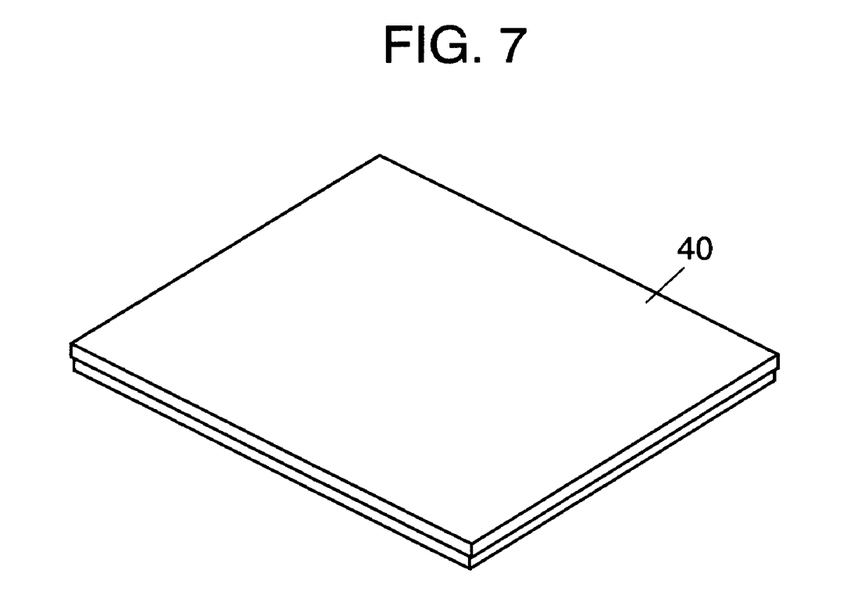
FIG. 7 is a perspective view illustrating a rear cabinet of the display unit according to the embodiment of the present invention.

As shown in FIGS. 1, 3, and 8, elongate cushions 25, made of nonwoven fabric for example, may be stuck on the inner surface of frame part 23 of front cabinet 21 with a dual-sided bonding tape or the like, to buffer contact of frame part 23 on display surface 31 of display device 30. Whether or not to use cushions 25 depends on an application and working conditions of the information apparatus.

Meanwhile, corner dampers 26 made of nonwoven fabric or the like are stuck on the four corners of the inner surface of side wall 24 using a dual-sided bonding tape or the like. Then, display device 30 is attached on the inner side of side wall 24 of front cabinet 21. Corner dampers 26 are used to prevent display device 30 from contacting the side wall directly. Using corner dampers 26 prevents fracture and chipping of the edge of a glass substrate used for a liquid crystal display device and the like. The height (heightwise of the side wall) of corner dampers 26 is preferably equal to or greater than the thickness of display device 30. The length (in circumferential direction of the side wall) could be a length sufficient for protecting the corners of display device 30, preferably equal to or greater than the width of the frame part.

Then as shown in FIG. 8, dual-sided bonding tape 28 is stuck on the surface of support rod 27 at a place where support rod 27 faces side wall 24. Support rod 27 has an elongate and quadrate cross sectional shape. Next, while applying a force in the direction of arrow A and additionally pressing support rod 27 in the direction of arrow B, support rod 27 is fixed to side wall 24 through dual-sided bonding tape 28. Support rod 27 works for fixing display device 30 and keeping it pressed against front cabinet 21.

In the process of mounting support rod 27 to side wall 24, jig 50 having a reverse L-shape in cross sectional view is preferably used. As shown in FIG. 8, closely fitting the upper right-hand corner of support rod 27, jig 50 is pressed in the direction of arrow A while being pressed in the direction of arrow B. Although it is difficult to press and fix support rod 27 with a roughly uniform force all over support rod 27 if support rod 27 is made of an elastic body or a deformable member, using jig 50 allows the mounting to be performed reliably and easily.

Figure 10A:
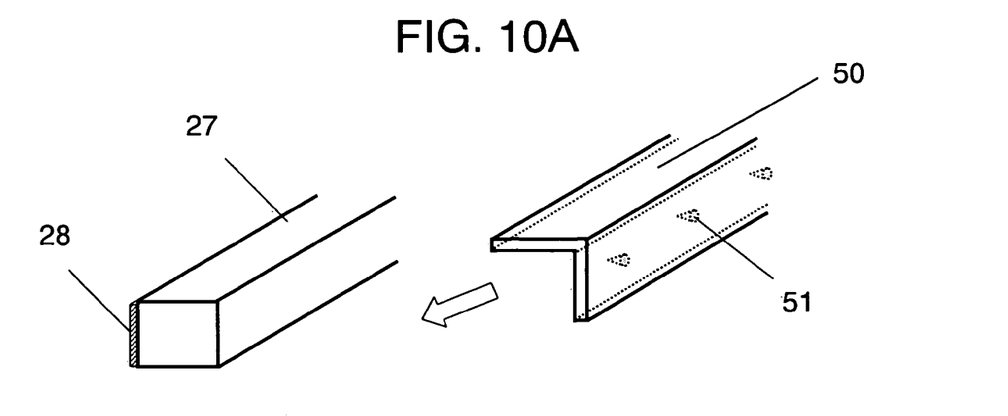
FIGS. 10A, 10B, and 10C are perspective views illustrating a method of assembling the display unit according to an embodiment of the present invention.
Figure 10B:
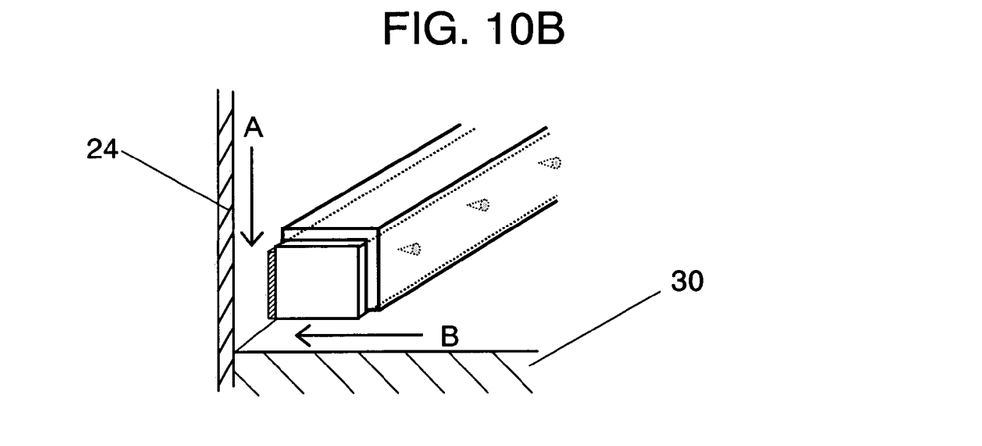

As shown in FIGS. 10A and 10B, needle-shaped projections 51 may be provided on the inner surface of jig 50.

Figure 10C:
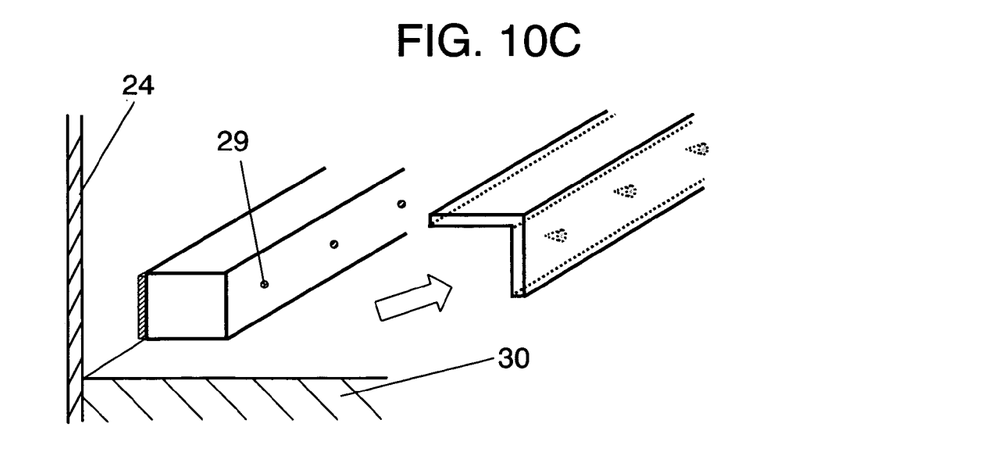

As shown in FIG. 10A, jig 50 having needle-shaped projections 51 is pressed against support rod 27 with dual-sided bonding tape 28 preliminarily stuck thereon. As a result of the pressing, needle-shaped projections 51 dig into the side face of support rod 27, and thus support rod 27 is temporarily held by jig 50. Next, as shown in FIG. 10B, support rod 27 being held by jig 50 is pressed onto a corner formed by display device 30 and side wall 24. At this moment, with support rod 27 pressed in the direction of arrow A through jig 50, support rod 27 is pressed against side wall 24 in the direction of arrow B. As a result, while pressing display device 30 in the direction of arrow A, support rod 27 is fixed to side wall 24 owing to dual-sided bonding tape 28. Then as shown in FIG. 10C, after support rod 27 is fixed to side wall 24, jig 50 is removed. At this moment, traces 29 of needle-shaped projections 51 may remain on the side face of support rod 27 depending on the material of support rod 27. As the side face corresponds to the backside of display device 30, traces 29 do not become defects in appearance. As described above, using jig 50 having needle-shaped projections 51 allows jig 50 to be handled integrally with support rod 27, thus remarkably improving the workability and enabling support rod 27 to be reliably fixed.

The number, arrangement, and shape of needle-shaped projections 51 can be selected as appropriate according to the size, weight, and the like of support rod 27. Further, instead of using needle-shaped projections 51, an adhesive layer with weak adhesiveness may be coated on the inner surface of jig 50. Alternatively, dual-sided bonding tape with weak adhesivity at least for the surface contacting support rod 27 may be stuck on the inner surface of jig 50. Even in this way, temporary retaining by support rod 27 can be secured. Here, "adhesive layer with weak adhesiveness" means that the adhesive layer has adhesiveness capable of holding the support rod 27 and that the adhesiveness is weaker than the adhesiveness of dual-sided bonding tape 28.

Here, support rod 27 is to be provided on at least two sides facing each other, of side wall 24 as shown in FIG. 1. Support rod 27 may be provided on three sides or on all four sides. Dual-sided bonding tape 28 may be stuck to support rod 27 or side wall 24 preliminarily.

After this, rear cabinet 40 is screwed or fixed by fitting, or the like, to cabinet 21, to complete display unit 20.

Here, support rod 27 is required to fix display device 30 while pressing it with a force as uniform as possible. Further, support rod 27 preferably works as buffer material for protecting display device 30 from an impact in a falling test. As a material of support rod 27, urethane foam with 25% compression stress (JIS K 7220) of 0.33 MPa or more may be suitable. An elastic body made of rubber can be used if its hardness is equal to or higher than 0.33 MPa, although weight reduction may not be remarkable. Besides an elastic body, a rigid body such as synthetic resin or metal may be used for support rod 27, if the falling tests of the information apparatus using such materials are found to cause no problems.

An adhesive may be applied instead of a dual-sided bonding tape used in the present embodiment.

Meanwhile, in this embodiment, side wall 24 is formed in a rib-like shape and spaced away from the four sides of front cabinet 21. That is to say, side wall 24 is spaced toward an inner circumferential side from the outer circumferential edge of the front cabinet by a given distance. However, side wall 24 can be provided at the outer circumferential edge of front cabinet 21.

In addition, cushioning material or an elastic member may be inserted at least one of between rear cabinet 40 and support rod 27, or between rear cabinet 40 and display device 30.

According to the embodiment, as a result that a display device is contained inside the area enclosed by the side wall of the front cabinet, and that the display device is pressed and fixed from above by a support rod made of material with a given hardness, the number of parts and man-hours can be reduced with a simple makeup. And the cabinet can be resistant to torsion owing to the reinforced cabinet strength utilizing the rigidity of the retained display device even with thin material of the cabinet for weight reduction.

In this embodiment, as shown in FIG. 9, display unit 20 is mounted to main body 11. The concept of the present invention may be applied as well to a display unit which can be separated from main body 11.

With the information apparatus and method of assembling the information apparatus, of the present invention, an information apparatus having a display device, such as a notebook computer or personal digital assistant, can be manufactured at a low cost and with reduced weight, offering high industrial applicability.

It will be obvious to those skilled in the art that various changes may be made in the above-described embodiment of the present invention. However, the scope of the present invention should be determined by the following claims.

What is claimed is:

1. A display unit comprising:
a display device having a front surface and a back surface;
a first case that has an opening, said first case including a frame part that covers an outer circumferential part of the front surface of the display device;
a second case that covers the back surface of the display device;
at least two support rods, each being constituted by an elastic body;
wherein the first case further includes a side wall orthogonally projecting from the frame part toward the second case over an entire circumference of the frame part, the side wall having a laterally inwardly-facing side face that faces laterally inwardly;
wherein the display device is surrounded by the side wall and disposed on the frame part, such that the side wall is disposed circumferentially and laterally outwardly of said display device; and
wherein each of the support rods has a first laterally-facing side surface that faces laterally outwardly so as to laterally face the laterally inwardly-facing side face of said side wall, and a second laterally-facing side surface that faces laterally inwardly away from the side wall;
wherein the at least two support rods are respectively fixed by adhesion members to the side wall orthogonally projecting from the frame part toward the second case in such a manner that each of said support rods is disposed at the back surface of the display device and presses the display device toward the frame part, and such that the adhesion members are respectively laterally interposed between the first laterally-facing side surfaces of the support rods and the laterally inwardly-facing side face of the side wall such that each of the adhesion members is disposed laterally outwardly of said at least two support rods and laterally inwardly of said side wall.

2. The display unit of claim 1, wherein the side wall is spaced inwardly from an outer circumferential edge of the frame part.

3. An information apparatus comprising:
the display unit of claim 2; and
a main body supporting the display unit.

4. The display unit of claim 1, wherein the display device has a quadrate outer shape, and wherein the at least two of the support rods are disposed on two opposite sides of the display device and face each other.

5. An information apparatus comprising:
the display unit of claim 4; and
a main body supporting the display unit.

6. The display unit of claim 1, wherein the elastic body of each of the support rods has 25% compression stress of 0.33 MPa or more.

7. An information apparatus comprising:
the display unit of claim 6; and
a main body supporting the display unit.

8. The display unit of claim 1, further comprising a corner damper at a corner of the side wall and at a position where the side wall faces a side face of the display device.

9. An information apparatus comprising:
the display unit of claim 8; and
a main body supporting the display unit.

10. The display unit of claim 1, further comprising a cushion between the frame part and the display device.

11. An information apparatus comprising:
the display unit of claim 10; and
a main body supporting the display unit.

12. The display unit of claim 1, wherein the display device is disposed on the frame part with the front surface of the display device facing the frame part.

13. An information apparatus comprising:
the display unit of claim 12; and
a main body supporting the display unit.

14. An information apparatus comprising:
the display unit of claim 1; and
a main body supporting the display unit.

15. The display unit of claim 1, wherein the adhesion member comprises dual-sided bonding tape.

16. The display unit of claim 1, wherein
each of the support rods has a front surface and a back surface, the front surface of each of said support rods facing the back surface of the display device, and the back surface of each of the support rods facing away from the display device; and
the adhesion members are adhered to the first laterally-facing side surfaces of the support rods, and to the laterally inwardly-facing side face of the side wall.

17. An information apparatus comprising:
the display unit of claim 16; and
a main body supporting the display unit.

18. A method of assembling a display unit including a display device having a front surface and a back surface, a first case having an opening, said first case including a frame part for covering an outer circumferential part of the front surface of the display device, and a side wall orthogonally projecting from the frame part toward the second case over an entire circumference of the frame part, and a second case for covering the back surface of the display device, the side wall having a laterally inwardly-facing side face that faces laterally inwardly, the method comprising:
placing the display device in the first case such that the display device is surrounded by the side wall and disposed on the frame part, such that the side wall is disposed circumferentially and laterally outwardly of said display device;
placing at least two support rods, each constituted by an elastic body, on the back surface of the display device such that each of the support rods has a first laterally-facing side surface that faces laterally outwardly so as to laterally face the laterally inwardly-facing side face of said side wall, and a second laterally-facing side surface that faces laterally inwardly away from the side wall;
fixing the support rods to the side wall orthogonally projecting from the frame part toward the second case via adhesion members, respectively, while pressing the support rods toward the frame part and the side wall, such that the adhesion members are respectively laterally interposed between the first laterally-facing side surfaces of the support rods and the laterally inwardly-facing side face of the side wall such that each of the adhesion members is disposed laterally outwardly of said at least two support rods and laterally inwardly of said side wall; and
fixing the second case to the first case.

19. The method of claim 18, wherein in said placing of the support rods and said fixing of the support rods, a jig, that is reverse L-shaped in cross section, is fitted to each support rod, and said each support rod is pressed toward the display device and simultaneously pressed against the side wall via the jig.

20. The method of claim 18 wherein, in said placing of the display device in the first case, the display device is disposed on the frame part such that the front surface of the display device faces the frame part.

21. The method of claim 18, wherein the adhesion member comprises dual-sided bonding tape.

22. The method of claim 18, wherein
the placing of the at least two support rods is carried out such that each of the support rods has a front surface and a back surface, the front surface of each of said support rods facing the back surface of the display device, and the back surface of each of the support rods facing away from the display device; and
the fixing of the support rods is carried out such that the adhesion members are adhered to the first laterally-facing side surfaces of the support rods, and to the laterally inwardly-facing side face of the side wall.

* * * * *